US012171323B2

(12) United States Patent
Cooper et al.

(10) Patent No.: US 12,171,323 B2
(45) **Date of Patent: *Dec. 24, 2024**

(54) VACUUM POUCH FOR ATHLETICS

(71) Applicant: NIKE, Inc., Beaverton, OR (US)

(72) Inventors: Aaron Cooper, Portland, OR (US); Austin Orand, Portland, OR (US); Nadia M. Panian, Beaverton, OR (US); Peter P. Williams, II, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,600

(22) Filed: Aug. 2, 2023

(65) Prior Publication Data

US 2023/0371678 A1 Nov. 23, 2023

Related U.S. Application Data

(63) Continuation of application No. 17/832,060, filed on Jun. 3, 2022, now Pat. No. 11,751,671, which is a (Continued)

(51) Int. Cl.
*A45F 5/02* (2006.01)
*A45F 5/00* (2006.01)
(Continued)

(52) U.S. Cl.
CPC ............ *A45F 5/02* (2013.01); *B31B 70/8131* (2017.08); *B65D 33/2508* (2013.01);
(Continued)

(58) Field of Classification Search
CPC .... A45F 5/05; B31B 70/8181; B65D 33/2591
(Continued)

(56) References Cited

U.S. PATENT DOCUMENTS 2,992,433 A * 7/1961 Roberge ............ A41D 13/0012 2/94
4,241,459 A * 12/1980 Quayle ............ A41D 13/0012 2/102
(Continued)

FOREIGN PATENT DOCUMENTS

CN 101166670 A 4/2008
CN 101462624 A 6/2009
(Continued)

OTHER PUBLICATIONS

FR 3012588 A1; Cholet, Daniel "Compressor Plate For Thermal Battery For Use of Cold Accumulator Block"; May 1, 2015 (Year: 2015).*
(Continued)

*Primary Examiner* — Nathan J Newhouse
*Assistant Examiner* — Lester L Vanterpool
(74) *Attorney, Agent, or Firm* — Banner & Witcoff, Ltd.

(57) ABSTRACT

A pouch or pocket may act as a container and may be used to securely hold objects (e.g., cell phone, keys, wallet, etc.) during athletic activity (e.g., running). The pouch may be a standalone item or integrally formed as part of other items. The pouch may hold the object to be stored in place within the pouch or pocket. The pouch may provide some cushioning or impact force attenuation to protect the object being held within the pouch or pocket. Additionally, the pouch may be attached to a garment, such as running clothes. The pouch includes an outer envelope sealable by a closure and a one-way valve with foam layers located inside the pouch. After the object is placed in the pouch, the closure is closed, and the air within the pouch is expelled via the one-way valve by compressing the foam layers from the outside.

17 Claims, 11 Drawing Sheets

Related U.S. Application Data continuation of application No. 17/166,481, filed on Feb. 3, 2021, now Pat. No. 11,388,981, which is a continuation of application No. 16/401,435, filed on May 2, 2019, now Pat. No. 10,939,745.

(60) Provisional application No. 62/667,098, filed on May 4, 2018.

(51) Int. Cl.
*B31B 70/81* (2017.01)
*B65D 33/25* (2006.01)

(52) U.S. Cl.
CPC . *A45F 2005/008* (2013.01); *A45F 2200/0516* (2013.01); *A45F 2200/0558* (2013.01)

(58) Field of Classification Search
USPC .......................................................... 224/158
See application file for complete search history.

(56) References Cited

U.S. PATENT DOCUMENTS

| | | | | | |
|---|---|---|---|---|---|
| 4,620,633 | A * | 11/1986 | Lookholder | B65D 81/03 | 53/472 |
| 5,129,519 | A * | 7/1992 | David | B65D 81/1075 | 206/592 |
| 5,272,856 | A * | 12/1993 | Pharo | B65D 81/052 | 53/472 |
| 5,395,681 | A | 3/1995 | Hargarter et al. | | |
| 5,586,615 | A | 12/1996 | Hammer et al. | | |
| 5,592,697 | A * | 1/1997 | Young | A45C 11/22 | 206/524.8 |
| 8,925,115 | B1 * | 1/2015 | Hanna | A61F 17/00 | 2/2.5 |
| 2001/0036520 | A1 | 11/2001 | Hall | | |
| 2005/0173439 | A1 * | 8/2005 | Chen | B65D 81/2023 | 220/495.06 |
| 2005/0286808 | A1 | 12/2005 | Zimmerman et al. | | |
| 2008/0226202 | A1 | 9/2008 | Dais et al. | | |
| 2008/0226203 | A1 | 9/2008 | Dais et al. | | |
| 2008/0307614 | A1 | 12/2008 | Dais et al. | | |
| 2010/0281831 | A1 | 11/2010 | Kannankeril et al. | | |
| 2010/0300919 | A1 | 12/2010 | Alipour | | |
| 2012/0304357 | A1 * | 12/2012 | Highfield | A41D 27/205 | 2/69 |
| 2015/0362293 | A1 | 12/2015 | Strauss | | |
| 2016/0194135 | A1 | 7/2016 | Baker | | |
| 2017/0096278 | A1 * | 4/2017 | Salazar | B65D 81/2023 | |

FOREIGN PATENT DOCUMENTS

| | | | |
|---|---|---|---|
| CN | 104126968 | A | 11/2014 |
| CN | 206446963 | U | 8/2017 |
| CN | 206665231 | U | 11/2017 |
| JP | 2017218157 | A | 12/2017 |

OTHER PUBLICATIONS

CN 206446963 U; Hangzhou Weipack Technology Co. Ltd.; Aug. 29, 2017 (Year: 2017).*
JP 2017218157 A; Sun A Kaken Co. Ltd.; Dec. 14, 2017 (Year: 2017).*
Jun. 25, 2019—(WO) ISR & WO—App. No. PCT/US19/030344.
Nov. 18, 2021—(EP) ESR = App. No. 21187664.4.

* cited by examiner

VACUUM POUCH FOR ATHLETICS

CROSS-REFERENCE TO RELATED APPLICATIONS

This application is a continuation of U.S. patent application Ser. No. 17/832,060, filed Jun. 3, 2022, which is a continuation of U.S. patent application Ser. No. 17/166,481, filed Feb. 3, 2021, and issued as U.S. Pat. No. 11,388,981 on Jul. 19, 2022, which is a continuation of U.S. patent application Ser. No. 16/401,435, filed May 2, 2019 and issued as U.S. Pat. No. 10,939,745 on Mar. 9, 2021, which claims priority to U.S. Provisional Patent Application No. 62/667,098, filed May 4, 2018, entitled Vacuum Pouch for Athletics, which are incorporated herein by reference in its entirety and made a part hereof.

BACKGROUND

When working out or running, people sometimes have objects, such as keys, cell phone, or wallet that they need to store or hold. Generally, a pouch or pocket is desired that may be used to securely hold these objects when working out (e.g., running).

SUMMARY

The present invention generally provides a device or apparatus that provides a vacuum pouch for athletics.

According to one embodiment, a pouch for securely holding objects during athletic activity includes an outer envelope, one or more foam components located within the outer envelope, a resealable opening located on an exterior of the outer envelope, and a one-way valve in communication with the interior chamber. The outer envelope may define an interior chamber that has a first major surface and a second major surface. The one or more foam components may include a first foam layer adjacent to the first major surface of the outer envelope and a second foam layer adjacent to the second major surface of the outer envelope. The resealable opening may provide an opening for an object to be inserted into the interior chamber. Further, once the object is inserted into the pouch, the resealable opening is closed and sealed and the one or more foam components are compressed. The compression of the one or more foam components expels the air from the interior chamber of the outer envelope via the one-way valve.

According to another embodiment, a garment may include a garment base material that includes one or more fabric components and a pouch releasably or fixedly attached to the garment base material. The pouch may be utilized for securely holding objects during athletic activity. The pouch may include an outer envelope, one or more foam components located within the outer envelope, a resealable opening located on an exterior of the outer envelope, and a one-way valve in communication with the interior chamber. The outer envelope may define an interior chamber that has a first major surface and a second major surface. The one or more foam components may include a first foam layer adjacent to the first major surface of the outer envelope and a second foam layer adjacent to the second major surface of the outer envelope. The resealable opening may provide an opening for an object to be inserted into the interior chamber. Further, once the object is inserted into the pouch, the resealable opening is closed and sealed and the one or more foam components are compressed. The compression of the one or more foam components expels the air from the interior chamber of the outer envelope via the one-way valve.

According to yet another embodiment, a pouch for securely holding objects during athletic activity may include an outer envelope, one or more foam components located within the outer envelope, a resealable opening located on an exterior of the outer envelope, a plate located between the outer envelope and the one or more foam components, and a one-way valve in communication with the interior chamber. The outer envelope may define an interior chamber that has a first major surface and a second major surface. The one or more foam components may include a first foam layer adjacent to the first major surface of the outer envelope and a second foam layer adjacent to the second major surface of the outer envelope. The resealable opening may provide an opening for an object to be inserted into the interior chamber. The resealable opening may include a closure to seal the resealable opening. The closure may include one of the following closures: a zippered closure, a pressure-resealable closure, or a sliding device closure. The plate may serve as a moderator to more evenly spread a compression force over the foam components to better expel the air and more evenly compress the object within the pouch. Further, once the object is inserted into the pouch, the resealable opening is closed and sealed and the one or more foam components are compressed. The compression of the one or more foam components expels the air from the interior chamber of the outer envelope via the one-way valve. The pouch may also include a set of straps that wrap around the outer envelope, wherein when pulling on a free end of the set of straps, the foam components compress and the air is expelled from the interior chamber of the outer envelope via the one-way valve. The pouch may also include a set of cables coupled to a plurality of rigid bands that wrap around the outer envelope, wherein when pulling on a free end of the set of cables, the rigid bands tighten around the outer envelope compressing the foam components and the air is expelled from the interior chamber of the outer envelope via the one-way valve.

Other features and advantages of the invention will be apparent from the following specification taken in conjunction with the following drawings.

BRIEF DESCRIPTION OF THE DRAWINGS

The present invention is illustrated by way of example and not limited in the accompanying figures in which like reference numerals indicate similar elements and in which.

Further, it is to be understood that the drawings may represent the scale of different components of one single embodiment; however, the disclosed embodiments are not limited to that particular scale.

DETAILED DESCRIPTION

Aspects of this disclosure relate to a pouch or pocket as a container that may be used to securely hold objects (e.g., cell phone, keys, wallet, etc.) during athletic activity, such as when working out (e.g., running). The pouch may be a standalone item or integrally formed as part of other items, such as an article of clothing, a belt (e.g. a fanny pack-type belt), a bag, etc. The pouch or pocket may be desired to hold the object to be stored in place within the pouch or pocket. The pouch or pocket may be desired to provide some cushioning or impact force attenuation to protect the object being held within the pouch or pocket. Additionally, the pouch or pocket may be attached to a garment, such as running clothes. The pouch or pocket may be desired to keep the object from bouncing around while running or otherwise working out and moving. The pouch includes an outer envelope sealable by a closure and a one-way valve. One or more foam layers are included inside the pouch. After the object is placed in the pouch, the closure is closed, and the air within the pouch is expelled via the one-way valve by compressing the foam layers from the outside. The compressed foam holds the object in place within the pouch.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Nothing in this specification should be construed as requiring a specific three dimensional orientation of structures in order to fall within the scope of this invention. Also, the reader is advised that the attached drawings are not necessarily drawn to scale.

Figure 1:
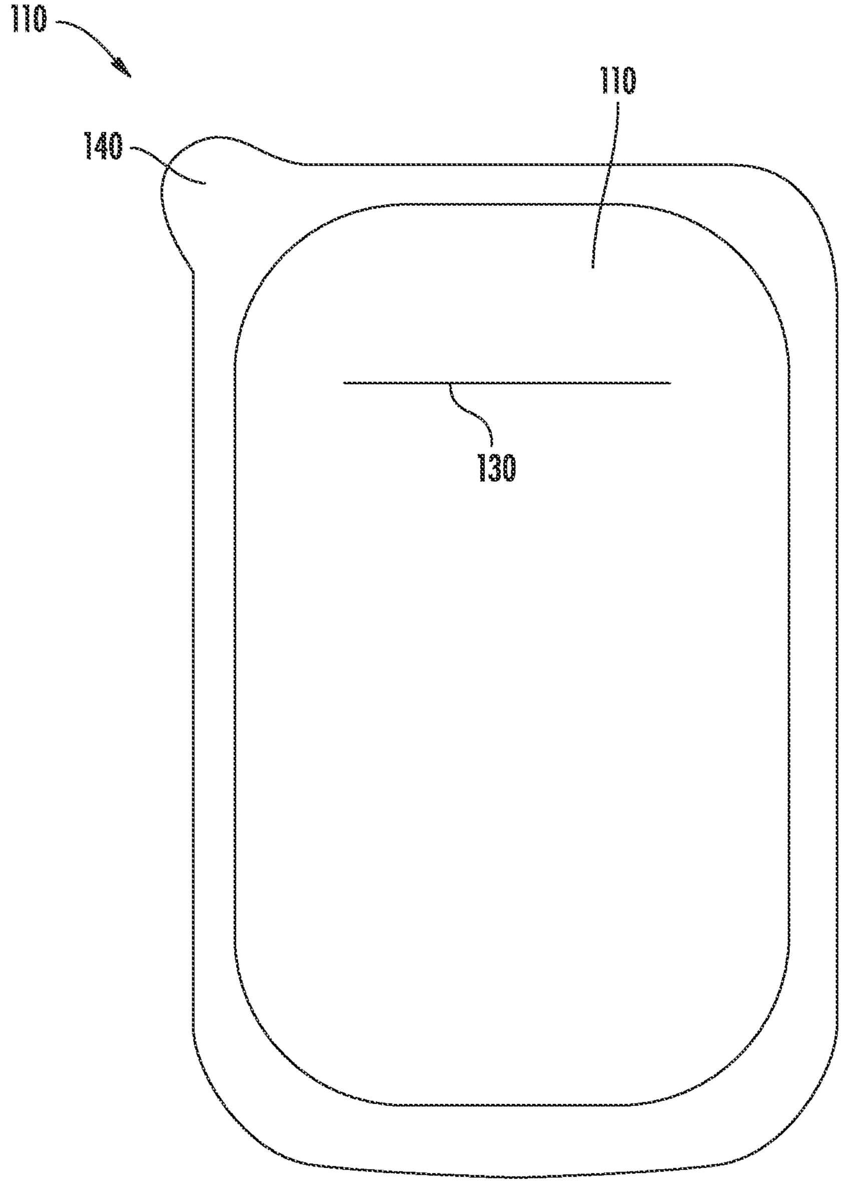
FIG. 1 depicts a top view of an example vacuum pouch, according to one or more aspects described herein.
Figure 2:
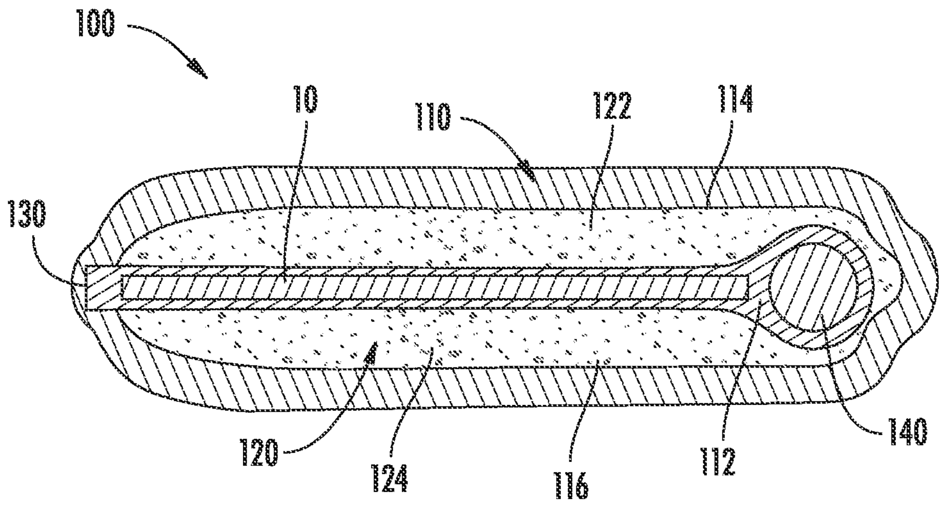
FIG. 2 depicts a cross-section view of an example vacuum pouch in an inflated configuration, according to one or more aspects described herein.
Figure 3:
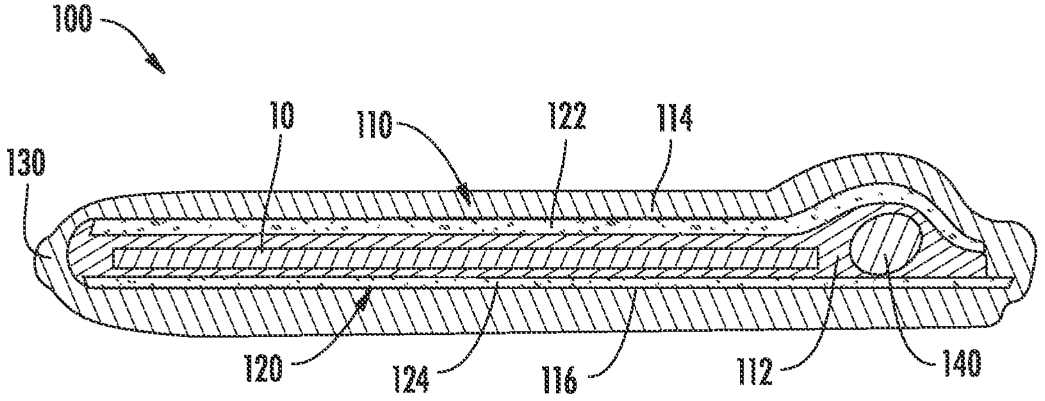
FIG. 3 depicts a cross-section view of the example vacuum pouch from FIG. 2 in a deflated configuration, according to one or more aspects described herein.

In the following description of the various embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made without departing from the scope and spirit of the present disclosure FIG. 1-3 depicts an example vacuum pouch 100 according to one or more aspects described herein. Specifically, FIG. 1 depicts a top view of the pouch 100. FIG. 2 depicts a cross-section view of the pouch 100 in an inflated configuration. FIG. 3 depicts a cross-section view of the pouch 100 in a deflated configuration.

As illustrated in FIGS. 1-3, aspects of this invention are directed towards a pouch 100 that includes an outer flexible envelope 110, one or more foam components 120 located within the outer flexible envelope 110, an openable/closable resealable opening 130, and a one-way valve 140. Any one-way valve 140 may be utilized as the one-way valve 140, such as for example duck-bill valves (such as Vernay Duckbill Check Valves, valves of the types shown in U.S. Pat. No. 6,936,130 (incorporated by reference), etc.). The outer flexible envelope 110 may define an interior chamber 112 that has a first major surface 114 and a second major surface 116 opposite the first major surface 114. The resealable opening 130 may be located on an exterior or the outer flexible envelope 110. The resealable opening 130 may provide an opening for an object 10 to be inserted into the interior chamber 112 and may allow the object 10 to be inserted inside the interior chamber 112. The resealable opening 130 may sealed many different times and is not a one-time sealed closure. The resealable opening 130 may include many different closure systems known and used in the art, such as a zippered closure, a pressure-resealable closure, or a sliding device closure.

The one or more foam components 120 may be, for example, an open cell foam. The foam components 120 may provide a first foam layer 122 adjacent the first major surface 114 and a second foam layer 124 adjacent the second major surface 116. The foam components 120 may be an open cell foam material with high rebound characteristics. Additionally the foam components 120 may include a plurality of lasered holes for zonal compression.

The pouch 100, the outer envelope 110, and the foam components 120 may be a rectangular shape as illustrated in FIGS. 1-3. Additionally, the pouch 100, the outer envelope 110, and the foam components 120 may be other shapes without departing from this invention. For example, the pouch 100, the outer envelope 110, and the foam components 120 may be a square shape, circular shape, or oval shape. Additionally, the pouch 100, the outer envelope 110, and the foam components 120 may be a 5-sided, 6-sided, or 8-sided polygon without departing from this invention. The pouch 100, the outer envelope 110, and the foam components 120 may be irregularly shaped also. In another embodiment without departing from the invention, the pouch 100, the outer envelope 110, and the foam components 120 may be different shapes as part of the same system, for example, the pouch 100 and the outer envelope 110 may be rectangular-shaped with the foam components 120 that are oval-shaped.

In use, an object 10 to be stored in the pouch 100 can be inserted through the resealable opening 130 and between the foam components 120 as illustrated in FIG. 2. FIG. 2 illustrates the pouch 100 in the inflated configuration. Once the object 10 is inserted into the pouch 100, the resealable opening 130 is closed using the closure system, which seals the outer envelope 110. Then, the user can compress the foam components 120 from the outside of the pouch 100, for example, by using his/her hand to compress the foam components 120. This compression of the foam components 120 expels the air from the interior chamber 112 of the outer envelope 110 via the one-way valve 140 that is in communication with the interior chamber 112. Because the valve 140 is a one-way valve, air can leave the interior chamber 112 by the valve 140 but not get back in. This compresses the pouch 100 to the deflated configuration as illustrated in FIG. 3.

Figure 4:
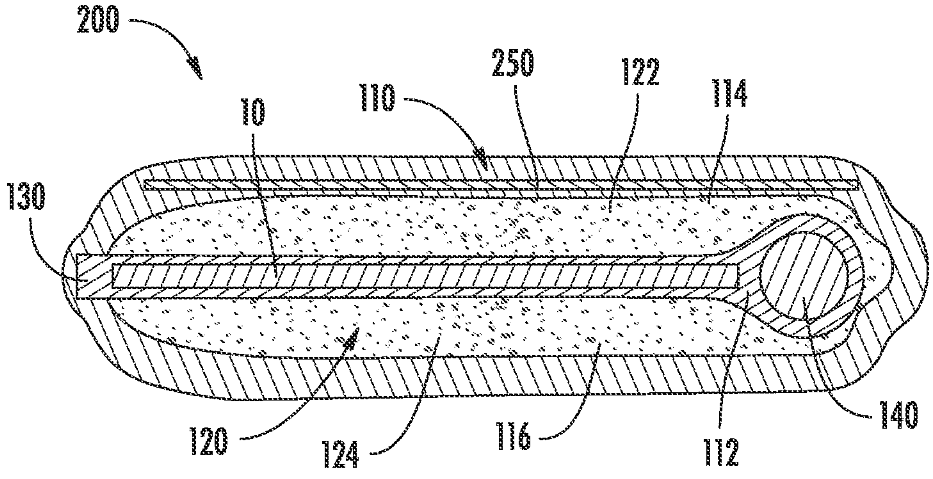
FIG. 4 depicts a cross-section view of another example vacuum pouch in an inflated configuration, according to one or more aspects described herein.
Figure 5:
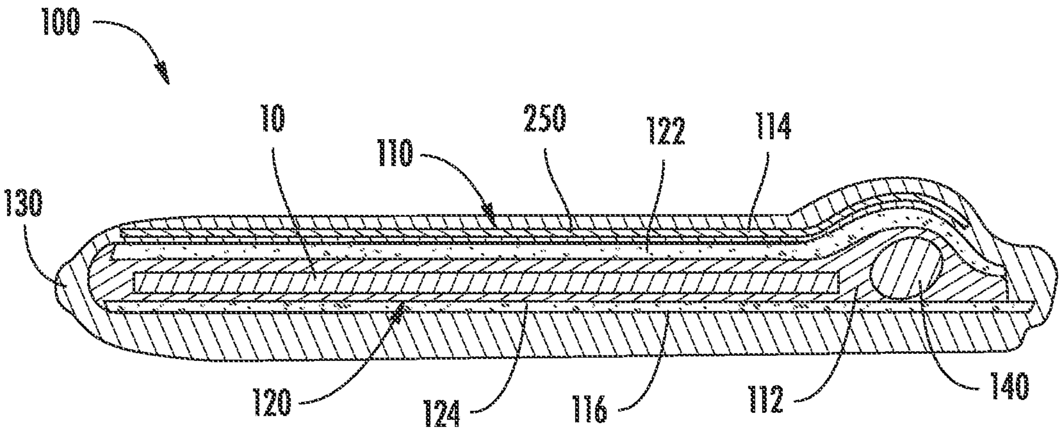
FIG. 5 depicts a cross-section view of the example vacuum pouch from FIG. 4 in a deflated configuration, according to one or more aspects described herein.

FIGS. 4 and 5 illustrate a second pouch assembly 200 according to one or more aspects described herein. Specifically, FIG. 4 depicts a cross-section view of the pouch 200 in an inflated configuration. FIG. 5 depicts a cross-section view of the pouch 200 in a deflated configuration. The pouch 200 illustrated in FIGS. 4 and 5 is the same as the pouch 100 as described above and illustrated in FIGS. 2 and 3, except that the pouch 200 includes a plate 250 located between the first major surface 114 of the outer envelope 110 and the first foam layer 122. The plate 250 may be a semi-rigid plate that serves as a moderator to more evenly spread the compression force over the area of the foam components 120. The plate 250 may also help to expel the air and more evenly compress the foam components 120 against the object 10 being held.

Figure 6:
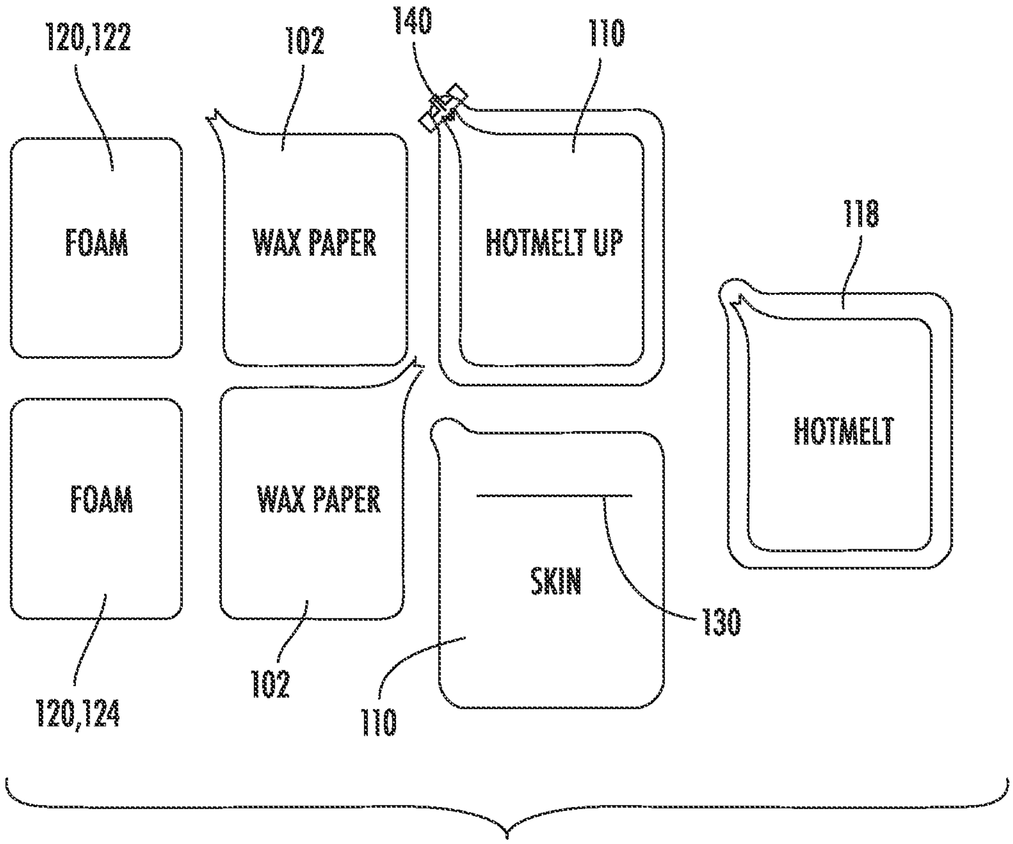
FIG. 6 depicts the various components of the example pouch, according to one or more aspects described herein.

FIG. 6 illustrates the different components of the pouch 100, 200. As illustrated in FIG. 6, the components of the pouch 100, 200 may include the foam components 120, which include both the first foam layer 122 and the second foam layer 124. The components of the pouch 100, 200 also may include the "hotmelt up" component which defines a layer of the flexible envelope 110 with the one-way valve 140. The components of the pouch 100, 200 also may include the "Skin" component which defines a layer of the flexible envelope 110 with the resealable opening 130. The components of the pouch 100, 200 also may include the "hotmelt" component which defines a rim or boundary 118 of hot melt that may be applied to the flexible envelope 110 to secure the pouch 100 to another object, such as a garment 12. The "wax paper" component 102 may be utilized between the facing interior edges of the foam layers 122, 124, for example to help the object 10 slide into and out of the interior pocket more easily and to prevent the foam layers 122, 124 from sticking together.

Figure 7:
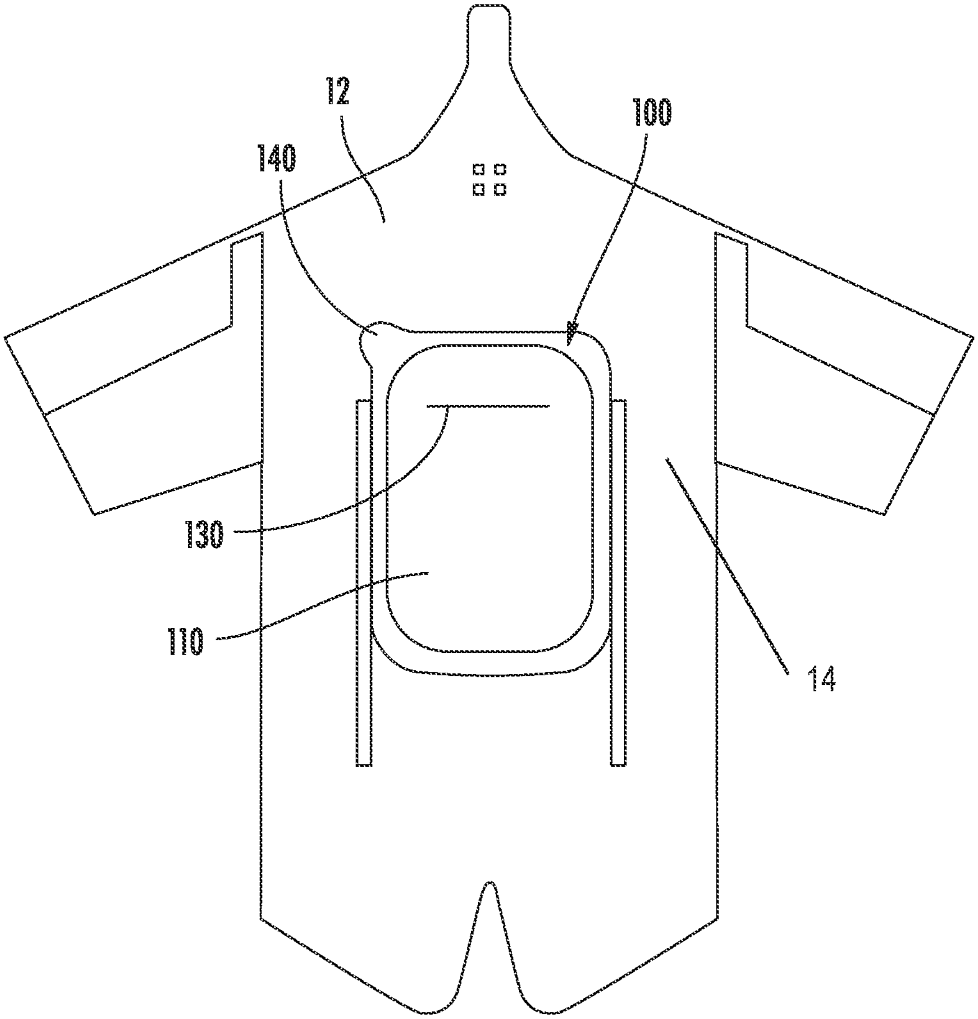
FIG. 7 depicts a view of the example vacuum pouch fixedly attached to a garment, according to one or more aspects described herein.

In some embodiments, the pouch 100, 200 may be attached to (or attachable to) a garment 12, such as a shirt, vest, shorts, pants, socks, hat, etc. The pouch 100, 200 may be fixedly attached to the garment 12, for example, by a hot melt adhesive, or by a plurality of sewn seams, etc. FIG. 7 illustrates a pouch 100, 200 attached to a garment 12. The garment 12 may include a garment base material 14, such as a one or more fabric materials or fabric components. The pouch 100 may be releasably or fixedly attached to the garment base material 14. Further, the pouch 100 may include a mechanism for releasably and permanently connecting the pouch 100 to another object, such as a garment 12. The mechanism may include a hook-and-loop fastener, hot melt adhesive, adhesive with release paper covering, snaps, button, magnetic connectors, etc.

In another embodiment of this invention relates to a system for compression the flexible envelope 110, for example, if the pouch 100, 200 is mounted on a back-side of the garment 12. A back-side mount is useful for a pouch 100, 200, for example, for running or other workouts, because it generally keeps the pouch 100, 200 out of the way of the running and other movements required while working out. However, if the pouch 100, 200 is mounted on the back of the garment 12, the object 10 may need to be inserted into the pouch 100, 200 before the garment 12 is donned (as the wearer may not be able to reach the resealable opening 130 at his/her back). While the foam layers 122, 124 could be compressed before the garment 12 is donned, this may cause undesired non-conformance of the shape of the pouch 100, 200 with respect to the wearer's body, which may make the pouch 100, 200 uncomfortable.

Figure 8:
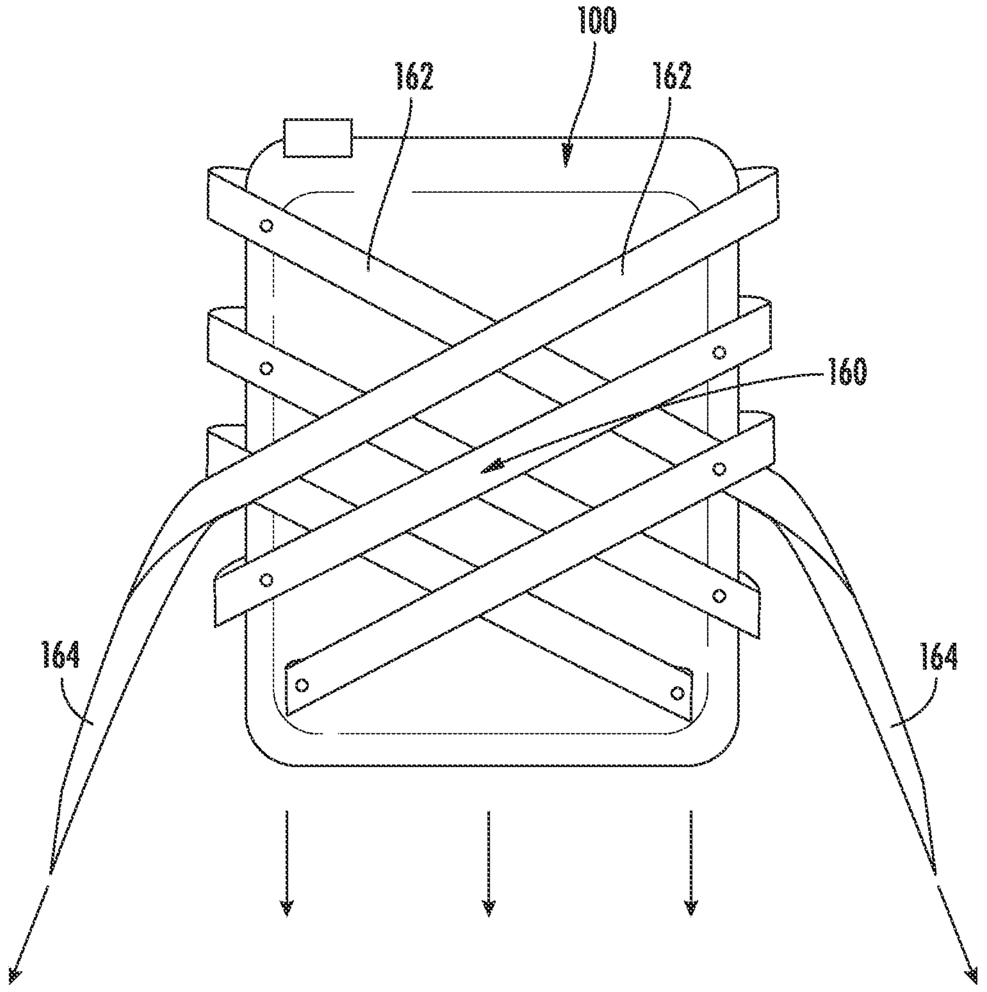
FIGS. 8 and 9 depict views of an example system for compressing the vacuum pouch, according to one or more aspects described herein.
Figure 9:
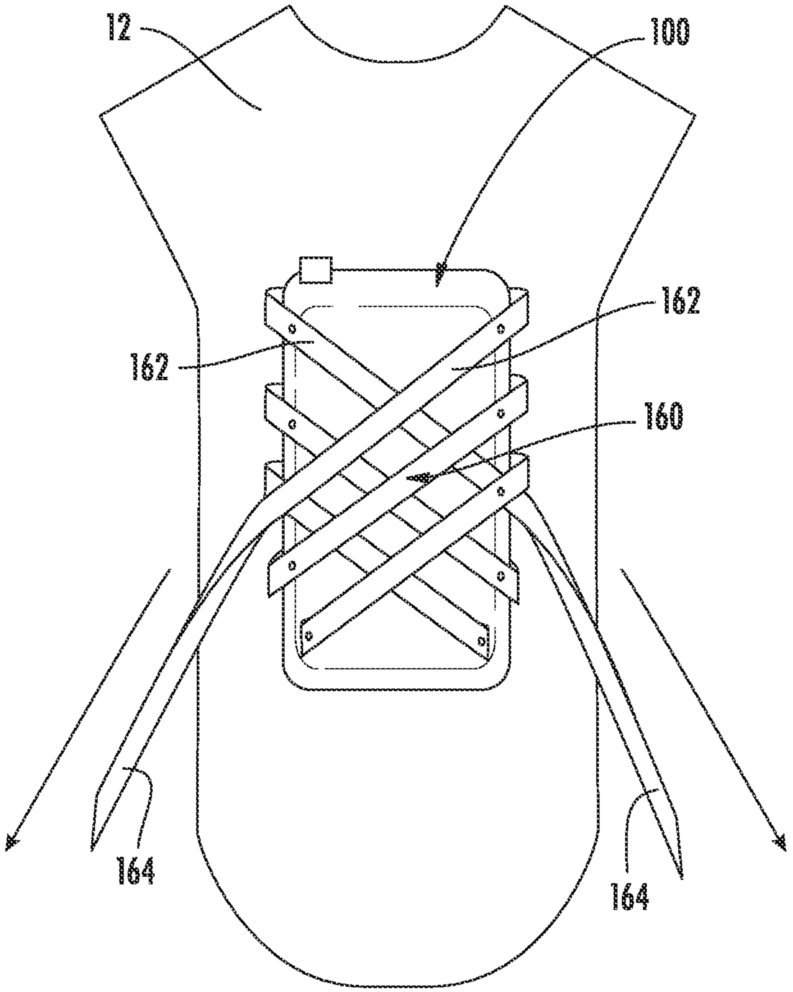

Therefore, in accordance with some aspects of this invention, the object 10 may be inserted into a back-side-mounted pouch 100, 200 before the garment 12 is donned and the pouch 100, 200 may be sealed by the resealable closure 130. But, the foam layers 122, 124 may not be compressed until after the pouch 100, 200 is donned. The pouch 100, 200 may be engaged with/include structures to enable to foam layers 122, 124 to be compressed by the wearer after the garment 12 is donned. FIGS. 8 and 9 illustrate an example compression structure 160 to compress the foam layers 122, 124.

As illustrated in FIGS. 8 and 9, a set of straps 162 may wrap around the flexible envelope 110. A finger trap strap configuration of the straps 162 may allow for the squeezing of the pouch 100 on both sides of the pouch 100. The finger trap strap configuration may be similar to a cylindrical, helically wound braid, usually the common biaxial braid, wherein pulling the straps 162 lengthens and narrows the strap configuration, thereby tightening around the pouch 100. The more the straps 162 are pulled, the more the envelop 110 shrinks and the straps 162 tightens around the envelope 110 and the pouch 100. By pulling on a free end 164 of the straps 162 (which the user can do from the front of the garment 12), the foam layers 122, 124 can be compressed, thereby expelling the air from the interior chamber 112 of the outer envelope 110 via the one-way valve 140. This compression action can also help allow the flexible envelope 110 of the pouch 100, 200 to better conform to the shape of the wearer's back. Additionally, the plate 250 as described in FIGS. 4 and 5 may help with this embodiment, for example, to help more evenly compress the foam layers 122, 124 within the flexible envelope 110. Other types of structure may be utilized to create the compression force on the foam layers 122, 124 from a pulling action, without departing from this invention.

Figure 10:
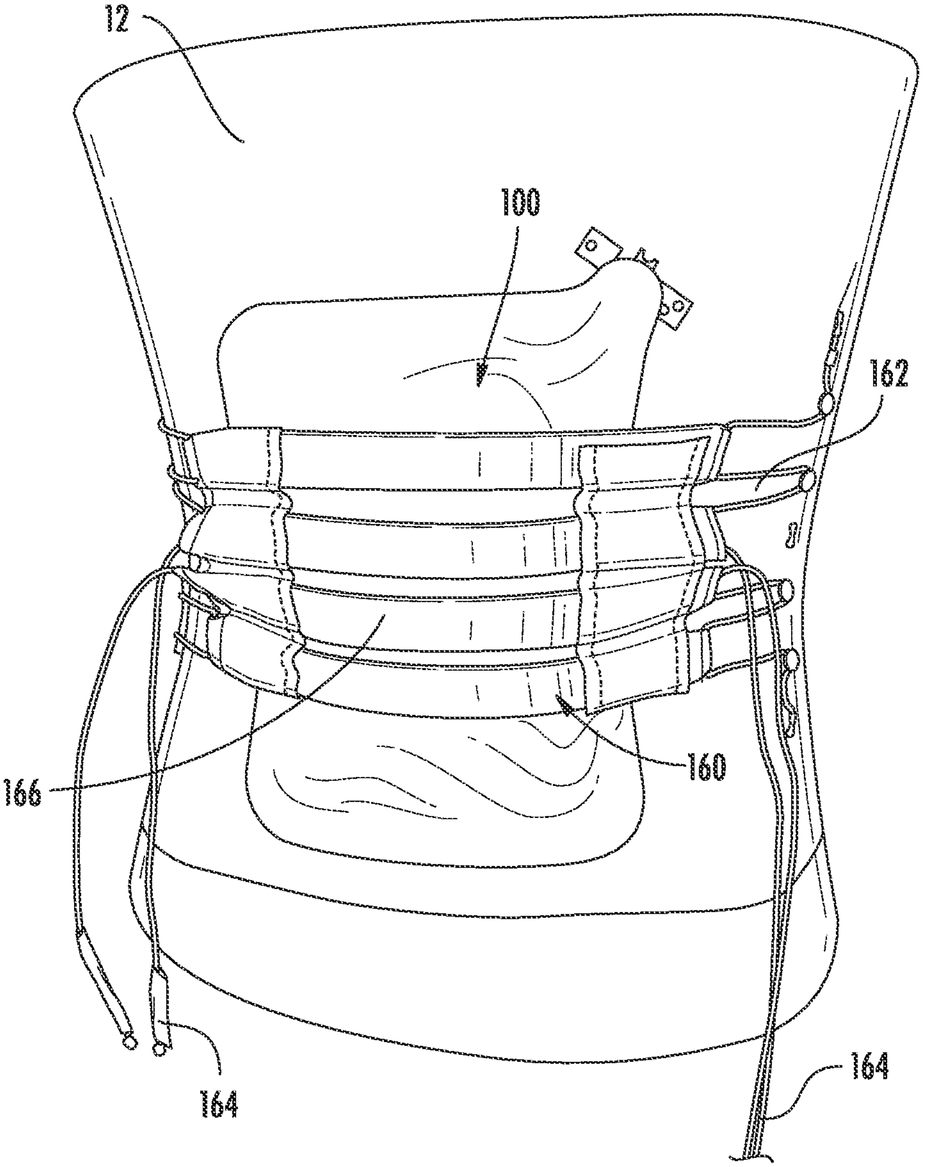
FIGS. 10 and 11 depict pictures of another example system for compressing the vacuum pouch, according to one or more aspects described herein.
Figure 11:
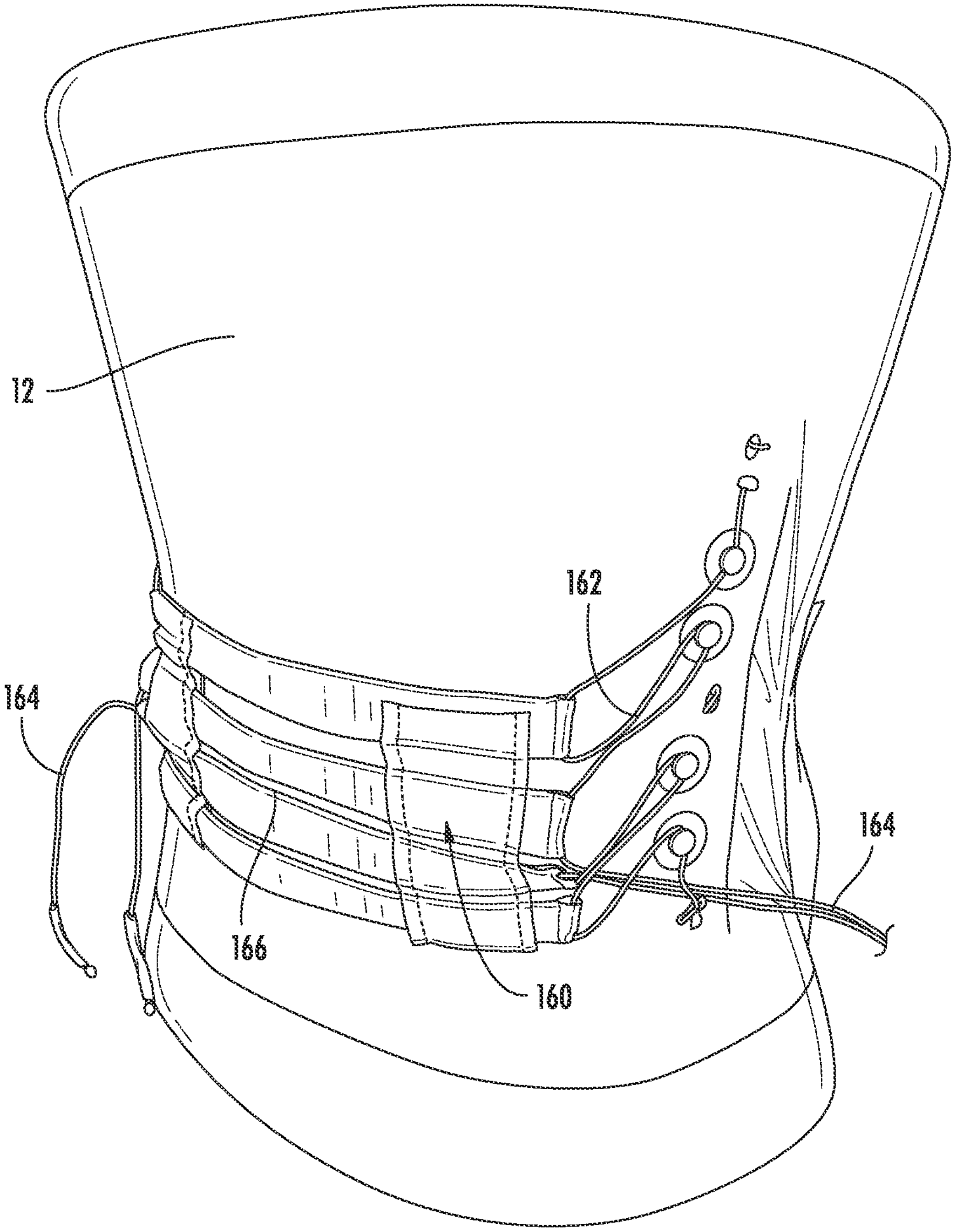

In another embodiment, FIGS. 10 and 11 illustrate a compression structure 160 to compress the foam layers 122, 124 that includes a set of lacing or cables 162 that can be used to pull at wider and more rigid set of bands 166 that when compressed against the foam components 120, expels the air from the interior chamber 112 of the outer envelope 110 via the one-way valve 140. The set of bands 166 may wrap partially or fully around or cover the flexible envelope 110. The set of bands 166 may not be part of the pulling structure but rather coupled to the set of lacing or cables 162. By pulling on a free end 164 of the straps 162 (which the user can do from the front of the garment 12), the set of bands 166 are tightened around the outer envelope 110 and the foam layers 122, 124 can be compressed, thereby expelling the air from the interior chamber 112 of the outer envelope 110 via the one-way valve 140. This compression action can also help allow the flexible envelope 110 of the pouch 100, 200 to better conform to the shape of the wearer's back. Additionally, the plate 250 as described in FIGS. 4 and 5 may help with this embodiment, for example, to help more evenly compress the foam layers 122, 124 within the flexible envelope 110.

The flexible envelope 110 or "skin" may be made from a material that provides some desired level of stretchability, particularly for pouches 100, 200 that are attached to a garment 12 and are located in close proximity to the wearer's body. The stretchable skin may allow the pouch 100, 200 to better "move" with the body as necessary, for example, to increase comfort and lessen undesirable impact on performance. Additionally, the stretchable skin of the flexible envelope 110 may be seal-proof, such that water or air cannot get inside the pouch 100, 200 and its stretch/skin-like properties without tearing or having any elongation. One suitable skin material is a lined-thermoplastic polyurethane (TPU) film available from San Fang under the name Desol Lining. Other materials that provide stretchability may be utilized without departing from this invention.

The pouch 100, 200 may be utilized for various applications other than attaching to apparel or garments. For example, as another option, this pouch system 100, 200 may be used as a containment for a protective plate in sports apparel. One specific example may be used with a soccer sock for containing a shin guard. A pouch-system 100, 200 of this type could be incorporated into a soccer sock. The shin guard could be placed into the pouch 100, 200 and the pouch 100, 200 could be closed and compressed. This pouch-system 100, 200 might help to keep the shin guard in place during use and play. The shin guard could then be removed from the pouch 100, 200 as needed. Other applications of this pouch system may be utilized without departing from this invention.

The pouch 100, 200 has the advantage of that the compression of the flexible envelope 110, the foam layers 122, 124, and the relative vacuum pressure formed within the interior chamber 112 generally hold the object 10 to be stored in place. When the pouch 100, 200 is attached to a garment 12 (e.g., running clothes), the pouch 100, 200 can help keep the object 10 from bouncing around while running or otherwise working out/moving. Although compressed, the foam layers 122, 124 can also provide some cushioning/impact force attenuation to protect the object 10 being held, such as a cell phone.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

We claim:

1. A pouch for securely holding objects during athletic activity, the pouch comprising:

- an outer envelope that defines an interior chamber that has a first major surface and a second major surface;
- one or more foam components located within the outer envelope, the one or more foam components including a first foam layer adjacent to the first major surface of the outer envelope and a second foam layer adjacent to the second major surface of the outer envelope;
- an opening located on an exterior of the outer envelope providing for an object to be inserted into the interior chamber;
- a hot melt component which defines a rim of hot melt that is applied to a perimeter of the outer envelope to fixedly attach the pouch to a garment; and
- a semi-rigid plate located between the outer envelope and the one or more foam components, the semi-rigid plate serving as a moderator to more evenly spread a compression force over the one or more foam components,
- wherein the opening is a resealable opening, wherein once the object is inserted into the pouch, the resealable opening is closed and sealed and the one or more foam components are compressed.

2. The pouch from claim 1, wherein the one or more foam components is an open cell foam with a high rebound characteristic.

3. The pouch from claim 1, wherein the one or more foam components includes a plurality of lasered holes for zonal compression.

4. The pouch from claim 1, wherein the resealable opening includes a closure configured to be sealed and the closure includes one of the following closures: a zippered closure, a pressure-resealable closure, or a sliding device closure.

5. The pouch from claim 1, further including a one-way valve in communication with the interior chamber, wherein the compression of the one or more foam components expels air from the interior chamber of the outer envelope via the one-way valve.

6. The pouch from claim 5, further including a set of straps that wrap around the outer envelope, wherein when pulling on a free end of the set of straps, the outer envelope compresses and air is expelled from the interior chamber of the outer envelope via the one-way valve.

7. The pouch from claim 5, further including a set of cables coupled to a plurality of rigid bands that wrap around the outer envelope, wherein when pulling on a free end of the set of cables, the rigid bands tighten around the outer envelope compressing the outer envelope and air is expelled from the interior chamber of the outer envelope via the one-way valve.

8. A garment comprising:

- a garment base material that includes one or more fabric components; and
- a pouch releasably or fixedly attached to the garment base material, the pouch for securely holding objects during athletic activity, the pouch including:
  - an outer envelope that defines an interior chamber that has a first major surface and a second major surface;
  - one or more foam components located within the outer envelope, the one or more foam components including a first foam layer adjacent to the first major surface of the outer envelope and a second foam layer adjacent to the second major surface of the outer envelope;
  - an opening located on an exterior of the outer envelope providing for an object to be inserted into the interior chamber; and
  - a semi-rigid plate located between the outer envelope and the one or more foam components, the semi-rigid plate serving as a moderator to more evenly spread a compression force over the one or more foam components,
  - wherein the pouch is fixedly attached to the garment base material and includes a hot melt component which defines a rim of hot melt that is applied to a perimeter of the outer envelope to fixedly attach the pouch to the garment,
  - wherein the opening is a resealable opening, wherein once the object is inserted into the pouch, the resealable opening is closed and sealed and the one or more foam components are compressed.

9. The garment from claim 8, wherein the pouch is releasably attached to the garment base material and includes a mechanism for releaseably and permanently connecting the pouch to the garment base material.

10. The garment from claim 8, wherein the pouch is fixedly attached to the garment base material via a plurality of sewn seams onto the garment.

11. The garment from claim 8, wherein the one or more foam components is an open cell foam with a high rebound characteristic.

12. The garment from claim 8, wherein the one or more foam components includes a plurality of lasered holes for zonal compression.

13. The garment from claim 8, further including a one-way valve in communication with the interior chamber, wherein the compression of the one or more foam components expels air from the interior chamber of the outer envelope via the one-way valve.

14. A pouch for securely holding objects during athletic activity, the pouch comprising:

an outer envelope that defines an interior chamber that has a first major surface and a second major surface;

one or more foam components located within the outer envelope, the one or more foam components including a first foam layer adjacent to the first major surface of the outer envelope and a second foam layer adjacent to the second major surface of the outer envelope;

an opening located on an exterior of the outer envelope providing for an object to be inserted into the interior chamber;

a hot melt component which defines a rim of hot melt that is applied to a perimeter of the outer envelope to fixedly attach the pouch to a garment; and a semi-rigid plate located between the outer envelope and the one or more foam components, the semi-rigid plate serving as a moderator to more evenly spread a compression force over the one or more foam components, wherein the opening is a resealable opening, wherein once the object is inserted into the pouch, the resealable opening is closed and sealed and the one or more foam components are compressed.

15. The pouch from claim 14, wherein the resealable opening includes a closure configured to be sealed and the closure includes one of the following closures: a zippered closure, a pressure-resealable closure, or a sliding device closure.

16. The pouch from claim 14, wherein the one or more foam components includes a plurality of lasered holes for zonal compression.

17. The pouch from claim 14, further including a one-way valve in communication with the interior chamber, wherein the compression of the one or more foam components expels air from the interior chamber of the outer envelope via the one-way valve.

* * * * *